March 14, 1967  W. R. BREWSTER  3,309,067

PORTABLE SELF-CONTAINED TANK AERATOR

Filed April 22, 1964

William R. Brewster
INVENTOR.

BY A. T. Sperry
ATTORNEY

United States Patent Office 3,309,067
Patented Mar. 14, 1967

3,309,067
PORTABLE SELF-CONTAINED TANK AERATOR
William R. Brewster, 1222 Range Ave.,
Clearwater, Fla. 33515
Filed Apr. 22, 1964, Ser. No. 361,658
7 Claims. (Cl. 261—30)

This invention relates to aerators for aquariums, small bait tanks, buckets, and like receptacles for aquatic life. More particularly, the invention is concerned with a small portable battery driven air pump unit enclosing disposable batteries for energizing the pump, thus avoiding the necessity of any exterior connections.

It is, of course recognized that many and various types of electrically driven means have been employed for delivering air below the surface of bait tanks, aquariums, and the like. However, such instrumentalities have heretofore been powered from a remote source of electrical current, such as conventional household current, or by storage batteries as may be employed in the ignition system of boats in which a bait tank is installed. The present invention provides a small, light-weight, readily portable battery driven pump for supplying air below the liquid surface of tanks, aquariums and the like.

Figure 1:
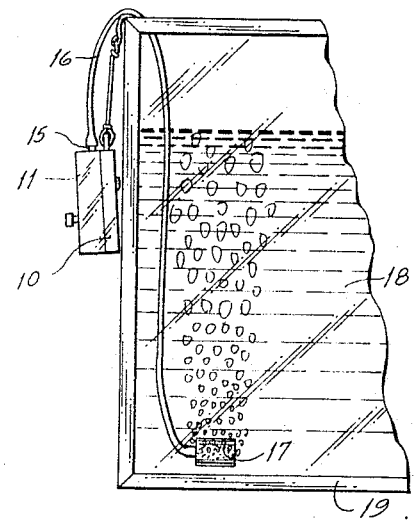
Figure 4:
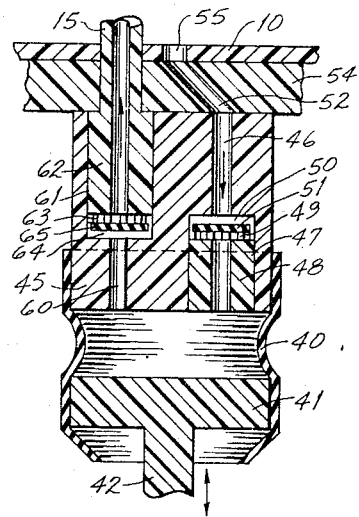
Figure 2:
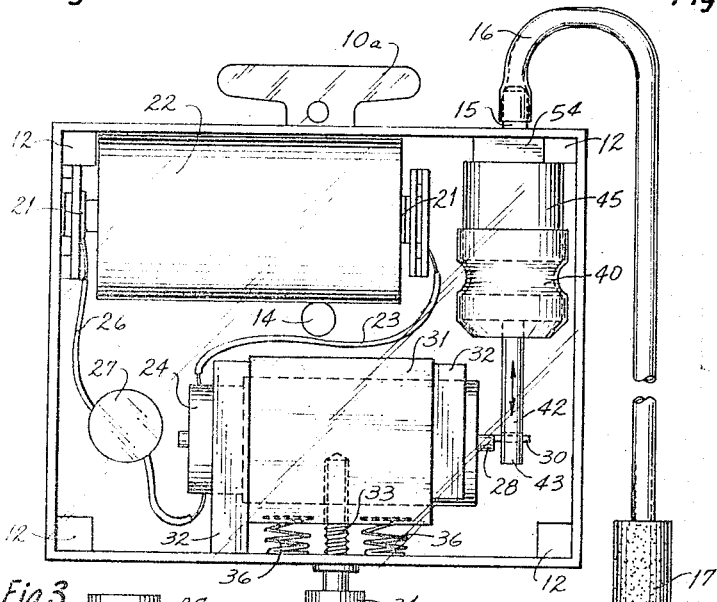
Figure 5:
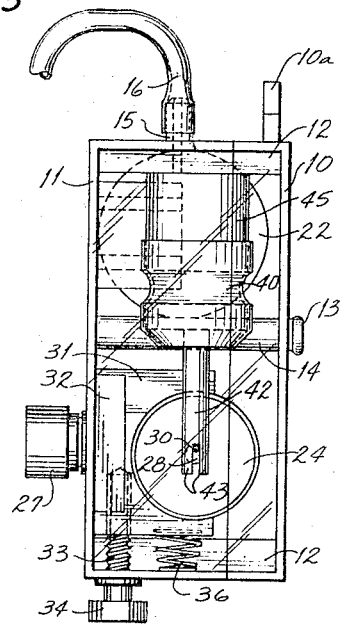
Figure 3:
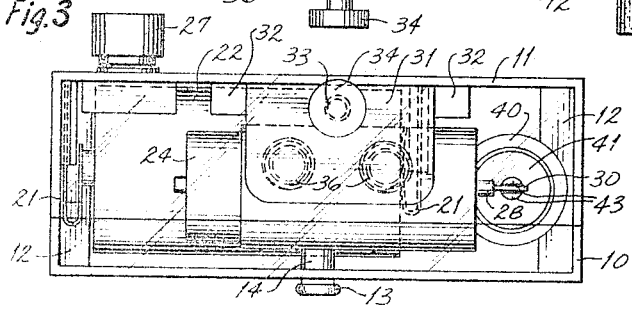

Among the objects of the present invention, is that of providing a compact, effective and efficient structure which will meet the demands of economic manufacture. A further object is to provide a device of the character set forth, which is simple, rugged and durable in construction, providing a long life of operation without requiring frequent battery renewal, and a device having control features whereby the supply of air to the liquid of the receptacle may be readily varied. Numerous other objects, features and advantages of the present invention will be apparent from a consideration of the following specification, taken in conjunction with the accompanying drawings, in which FIG. 1 is a perspective view showing one preferred form of the invention, as applied to a fragmentarily disclosed aquarium tank or the equivalent, FIG. 2 is a front elevation of the device, with the housing cover removed, FIG. 3 is a bottom plan view of that form of the invention shown in FIGURES 1 and 2, FIG. 4 is an enlarged sectional view of the preferred pump mechanism of the present invention; and FIG. 5 is an end elevation with the end of the housing removed.

That form of the present invention, here shown by way of illustration, includes a generally rectangular shallow housing body 10, which in the present commercial form of the invention, is formed of light-weight, rugged, durable and impervious material, such as plastic. A rectangular cover 11 is sealingly fitted in abutting relation with the edges of the open sides of the body 10, by engagement over corner posts 12 and releaseably secured by a retaining screw 13 engaging a central internal post 14, whereby it may be readily removed for the replacement of batteries, inspection, repair, or adjustment of working parts. In operation air is pumped from an outlet nipple 15 through a flexible delivery tube 16 to a porus discharge element 17, such as formed from Carborundum, suitably disposed beneath the surface of the water 18 of the tank 19 to be discharged as fine bubbles for supplying required oxygen.

Within the housing body 10 there is provided a pair of spaced battery mounting and contact spring assemblies 21, which frictionally receive and secure a removable battery 22 therebetween. A suitable conductor 23 extends from one of the contact spring assemblies 21 to a rotary electrical motor 24. A conductor 26 from the opposite assembly 21 leads through a conventional on and off switch 27 to the motor, by which the energization of the motor may be controlled. Upon energization, the motor shaft 28 is rotated to move its eccentrically extended drive tip 30 in an orbital path.

An important feature of the present invention, is the mounting of the motor 24 for transverse adjustment across the housing, thus altering the orbital path of movement of the drive tip 30 of the motor shaft. As will be hereinafter noted, such adjustment of the orbital path of the tip is utilized for varying the stroke of the pump piston and hence the volume of air delivered. For adjustably mounting the motor 24, there is provided a motor mounting cradle 31 slidable between ways 32 under the control of a threaded speed control screw 33, having an exterior knob 34 for ease of adjustment of the motor location through movement of the cradle. Since the thrust of the adjusting screw 33 is conveniently applied at the base of the cradle 31, compression springs 36 are provided to offset any tilting effect upon the cradle by adjustment of the screw 33. Thus the cradle 31 is maintained in rectilinear alignment throughout its adjustments between its ways 32.

The pump of the present invention, as shown in FIGURE 4, includes a flexible pump bellows 40 within which a piston 41 is reciprocated to expand and contract the bellows volume in response to reciprocation of an outwardly extending piston rod 42. As more clearly shown in FIGURE 5, the outer terminal end of the piston rod 42 is bifurcated as at 43 to receive the drive tip 30 of the motor shaft 28. This arrangement is such that as the motor shaft is rotated upon energization of the motor, the drive tip will move in its orbital path to inwardly move the piston rod 41, from which position the piston moves outwardly as pressure from the orbitally moving tip is released by the flexible character of the bellows 40. Since the bodily movement of the motor through adjustment of the screw 33 associated with the cradle 31, alters the area of the orbital path of movement of the tip 30 towards and away from the axis of the pump shaft 42, the length of the piston thrust will be varied as the location of the motor is adjusted by movement of the cradle. Obviously, since the thrust of the shaft may thus be altered, the total movement of the piston is altered and the amount of air discharged at each stroke of the piston may be adjusted accordingly.

The inner end of the bellows 40 sealingly encircles the outer end of the pump block 45. The pump block 45 defines an inlet duct 46 having a counter-bore 47 in which is located a hollow air inlet plug 48. The inner end of the plug 48 is provided with serrations constituting spaced valve receiving seats 49 spaced from the inner terminal end of the counter bore 47, whereby a valve chamber 50 is provided to receive a valve disc 51. As the piston 41 moves outwardly, it will be seen that air may be drawn in through the duct 46 and through a companion duct 52, in the pump base plate 54 communicating through the casing 10 by aperture 55. In such outer movement of the piston 41, the valve disc 51 will be received on the spaced seats 49 to permit the air to move past and around the disc 51 to enter the bellows 40. However, as the piston moves inwardly, pressure in the bellows will move the disc 51 against the inner end of the duct 46 to seal the same. Thus there is provided a check valve within the pump body 45, permitting air to enter the bellows from the aperture 55 of the casing 10, but precluding a discharge of the air through such aperture.

Similarly, the pump body 45 defines a discharge duct 60 leading to a counter-bore 61 wherein there is inserted a tubular valve seat element 62 provided with projections 63 similar to those at 49, hereinbefore referred to. A disc 65 within the chamber 64 acts to permit the discharge of air by inward movement of the piston 41 and precludes intake of air as the piston 41 moves outwardly away from the pump block 45. There is thus provided a companion reverse acting check valve arrangement for the delivery of air from the pump block 45 as the piston 41 is reciprocated. The element 62 is formed with the nipple 15 to which the discharge tube 16 is fixed.

By this construction, it will be seen that as the self-contained battery of the housing delivers energy to the motor, the motor shaft is rotated to arbitrarily move the drive tip and thus reciprocate the pump shaft 42 to provide for drawing air from outside the casing 10 through the aperture 55 and delivering the same, in pulsations as the piston 41 is reciprocated, to the nipple 15. By a transverse adjustment of the motor, the pump thrust may be altered to vary the volume of air delivered with each reciprocation.

From the foregoing, it may be seen that the present invention provides a novel, simple, effective and efficient self-contained portable means for providing its own power for producing air flow at selected volumes. It will, of course, be understood that numerous changes, modifications and the full use of equivalents may be resorted to in the practice of the invention, as outlined in the appended claims.

What I claim is:

1. A portable self-contained tank aerator, including a casing, a rotary electric motor within said casing, a variable displacement air pump within said casing, air inlet means communicating with said pump for supplying air thereto, an air outlet conduit connected to said pump for delivering to a remote location air discharged by said pump, and mechanism for actuating said pump by said motor, said air pump comprising a reciprocable piston having a bifurcated driven end, said mechanism comprising an eccentrically driven pin extending outwardly of the rotary output shaft of said motor and transversely received within said bifurcated driven end, and means mounting said motor for slidable movement on an axis parallel to the axis of movement of said pump piston.

2. A portable self-contained tank aerator, including a casing, a rotary electric motor within said casing, a battery within said casing for energizing said motor, an air pump within said casing, air inlet means communicating with said pump for supplying air thereto, an air outlet conduit connected to said pump for delivering to a remote location air discharged by said pump, and means interconnecting said motor and pump for motivating said pump upon energization of said motor, said air pump comprising a reciprocable piston having a bifurcated driven end, said interconnecting means comprising an eccentrically driven pin extending outwardly of the rotary output shaft of said motor and transversely received within said bigurcated driven end, and means mounting said motor for slidable movement on an axis parallel to the axis of movement of said pump piston.

3. In a tank aerator, a motor-pump assembly, including a piston pump, air inlet means communicating with said pump for supplying air thereto, an air outlet conduit connected to said pump for delivering to a remote location air discharged by said pump, a rotary electric motor, a motor shaft for said motor and having an outwardly-extending, eccentrically disposed shaft tip and a pump piston for said pump operatively engageable with said eccentric motor shaft, said pump piston having a bifurcated driven member defining a recess within which said motor shaft tip is received.

4. In a tank aerator, a motor-pump assembly, including a piston air pump, air inlet means communicating with said pump for supplying air thereto, an air outlet conduit connected to said pump for delivering to a remote location air discharged by said pump, a rotary electric motor, an eccentric motor shaft for said motor and a pump piston for said pump operatively engageable with said eccentric motor shaft, and means for altering the relative position of said motor and pump to vary the stroke of the pump piston by rotation of said eccentric motor shaft.

5. In a tank aerator, a motor-pump assembly, including a piston pump, air inlet means communicating with said pump for supplying air thereto, an air outlet conduit connected to said pump for delivering to a remote location air discharged by said pump, a battery operated rotary electric motor, an eccentric motor shaft for said motor, a pump piston for said pump operatively engageable with said eccentric motor shaft, and means for altering the relative position of said motor and pump to vary the stroke of the pump piston by rotation of said eccentric motor shaft, said means including a slidable mounting for said motor.

6. A portable self-contained tank aerator, including a casing and means for supporting said casing externally of a fish tank, an air tube extending from said casing into the water of said tank, a reciprocating air pump in said casing communicating with said tube for delivering air therethrough, a pump piston for said pump defining a bifurcated driven end, a battery driven electric motor in said casing, including a rotary motor shaft having an eccentric engageable between the furcations of said pump piston, whereby rotation of said shaft will impart reciprocation to said piston, and means mounting said motor for slidable movement on an axis parallel to the axis of movement of said pump piston.

7. A portable self-contained tank aerator, including a casing and means for supporting said casing externally of a tank, an air tube extending from said casing into the water of said tank, a reciprocating air pump in said casing communicating with said tube for delivering air therethrough, a pump piston for said pump defining a bifurcated driven end, a battery driven electric motor in said casing, including a rotary motor shaft having an eccentric engageable between the furcations of said pump piston, whereby rotation of said shaft will impart reciprocation to said piston, and slidable mounting means for said motor whereby slidable adjustment will alter the effective eccentricity of said shaft with respect to said pump piston to alter the output of said pump in response to a fixed speed of rotation of said motor.

References Cited by the Examiner
UNITED STATES PATENTS

| | | | |
|---|---|---|---|
| 2,429,441 | 10/1947 | Williams | 261—121 |
| 2,524,645 | 10/1950 | Abbott | 103—38 |
| 2,666,392 | 1/1954 | Martin | 103—38 |
| 2,808,196 | 10/1957 | Williams | 261—121 |
| 2,919,120 | 12/1959 | Baxter | 261—121 |
| 3,066,611 | 12/1962 | Schwartmann et al. | 103—38 X |

HARRY B. THORNTON, *Primary Examiner.*

T. R. MILES, *Assistant Examiner.*